Patented July 12, 1932

1,867,090

UNITED STATES PATENT OFFICE

PAUL NAWIASKY, OF LUDWIGSHAFEN-ON-THE-RHINE, AND HUGO WOLFF, OF MANNHEIM, GERMANY, ASSIGNORS TO GENERAL ANILINE WORKS, INC., OF NEW YORK, N. Y., A CORPORATION OF DELAWARE

METHOD FOR THE PRODUCTION OF VAT DYESTUFFS AND THE PRODUCT THEREOF

No Drawing. Application filed August 11, 1928, Serial No. 299,112, and in Germany August 18, 1927.

We have found that aminobenzanthrones in which the amino group is situated in that benzene nucleus of the fundamental anthraquinone, which is not linked with the engrafted benzene nucleus, namely, the 5-, 6-, 7-, or 8-aminobenzanthrones, are converted into valuable vat dyestuffs by treatment with alkaline condensing agents. The reaction is suitably carried out at about between 100° and 250° C. According to the conditions of working, for instance when condensing with an alcoholic caustic alkali melt on the one hand and a caustic alkali melt on the other hand, or varying the conditions with regard to proportion, temperature and the like, different dyestuffs are obtained, part of which presumably belong to the dibenzanthrone series and others to the isodibenzanthrone series. The aminobenzanthrones serving as initial materials may be prepared from the corresponding halogenbenzanthrones by the action of ammonia thereon at an elevated temperature.

The following examples will further illustrate the nature of the said invention which however is not limited thereto. The parts are by weight.

Example 1

10 parts of caustic potash and 8 parts of ethyl alcohol are heated, while stirring, to 140° C., 1.5 parts of 5-aminobenzanthrone (prepared from 5-chlorbenzanthrone obtainable in mixture with 4- and 8-chlorbenzanthrone from 1-chloranthraquinone by usual methods and from which mixture it may be separated by crystallization) being then introduced, and the temperature maintained at from 140° to 150° C. for a further half hour. At the end of that time, the mass is poured into water, and the resulting dyestuff, after being precipitated by the passage of a current of air, is treated in the usual manner. The probable course of the reaction is represented by the following equation:

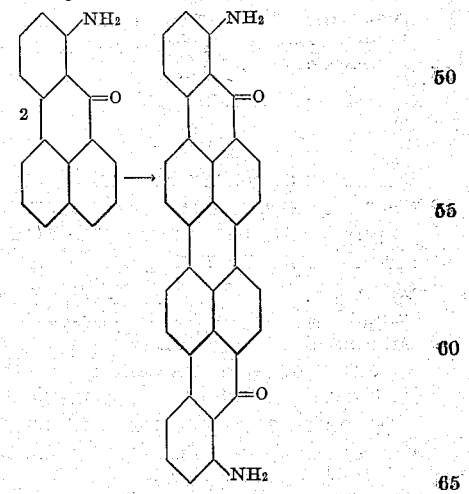

The new dyestuff gives blue dyeings, fast to chlorine, on cotton from a greenish blue vat. The color of the solution of the dyestuff in sulfuric acid is Bordeaux red.

If 5-aminobenzanthrone be fused with caustic potash, at 230° C. in the absence of alcohol, a similar dyestuff is obtained which however yields somewhat duller dyeings.

Example 2

1 part of 6-aminobenzanthrone is introduced, at 170° C. into a melt of 10 parts of caustic potash and 8 parts of ethyl alcohol, the melt being then kept at the same temperature for a further half hour. On being treated in the usual way, the reaction mixture furnishes a grey-violet dyestuff, the dyeings from which on cotton turn greenish grey after chemicking. The dyestuff gives a grey green solution in 66° Bé. sulfuric acid, and the vat is violet blue.

Example 3

2 parts of 6-aminobenzanthrone are introduced, at 230° C., into a melt of 20 parts of caustic potash, and the mixture is maintained at the same temperature for about a further half hour. The dyestuff, treated as in Example 1, dissolves to a Bordeaux red solution in concentrated sulfuric acid, and gives greenish grey dyeings on cotton from a violet vat, the color changing to dark green on chemicking.

The dyestuff can be freed from components which only faintly dye, if at all, by vatting, filtering the vat and precipitating the dyestuff again by blowing a current of air through the vat.

On replacing the 6-aminobenzanthrone in this example by 7-aminobenzanthrone, a dyestuff is obtained which also gives a Bordeaux red solution in concentrated sulfuric acid. It furnishes violet dyeings on cotton from a red tinged blue vat, the color being changed to grey by chemicking.

The dyestuff can be purified from the vat in the aforesaid manner. Mixtures of the dyestuffs obtained from 6-aminobenzanthrone and 7-aminobenzanthrone in the proportion 4 to 1 dye cotton deep black shades of remarkable fastness.

Example 4

2 parts of 8-aminobenzanthrone are introduced, at from 150° to 155° C. into a melt of 10 parts of caustic potash and 8 parts of ethyl alcohol, and the mixture is maintained at the same temperature for a further half hour. On being treated as in Example 1, the melt furnishes a dyestuff which dissolves to a green solution in concentrated sulfuric acid, and gives greyish blue dyeings on cotton from a green-tinged blue vat. Chemicking produces only a slight change in the color.

What we claim is:—

1. A process of producing vat dyestuffs which comprises heating an aminobenzanthrone selected from the group consisting of 5-, 6-, 7- and 8-aminobenzanthrones in the presence of an alkaline condensing agent at a temperature sufficient to bring about condensation.

2. A process of producing vat dyestuffs which comprises causing an aminobenzanthrone selected from the group consisting of 5-, 6-, 7- and 8-aminobenzanthrones to react at a temperature above 100° C. with an alkaline condensing agent.

3. A process of producing vat dyestuffs which comprises treating an aminobenzanthrone selected from the group consisting of 5-, 6-, 7- and 8-aminobenzanthrones with caustic alkali at a temperature between about 100° and 250° C.

4. A process of producing vat dyestuffs which comprises treating an aminobenzanthrone selected from the group consisting of 5-, 6-, 7- and 8-aminobenzanthrones with alcoholic caustic alkali at a temperature between about 100° and 250° C.

5. A process of producing vat dyestuffs which comprises treating 5-aminobenzanthrone with caustic alkali at a temperature between about 140° and 230° C.

6. A process of producing a vat dyestuff which comprises treating 5-aminobenzanthrone with a mixture of ethyl alcohol and caustic potash at a temperature between about 140° and 150° C.

7. As new article of manufacture the vat dyestuff giving blue dyeings on cotton fast to chlorine from a greenish blue vat, dissolving to a claret red solution in concentrated sulfuric acid, substantially identical with the dyestuff obtainable by treating 5-aminobenzanthrone with caustic alkali at a temperature between about 140° and 230° C. and probably corresponding to the formula:

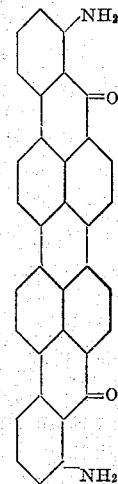

In testimony whereof we have hereunto set our hands.

PAUL NAWIASKY.
HUGO WOLFF.